United States Patent Office 3,196,183
Patented July 20, 1965

3,196,183
PREPARATION OF ALKYLATED
DECABORANES
David M. Gardner, Dover, N.J., assignor, by mesne assignments, to Thiokol Chemical Corporation, a corporation of Delaware
No Drawing. Filed Oct. 1, 1956, Ser. No. 613,354
2 Claims. (Cl. 260—606.5)

This invention relates to a novel method for the preparation of alkylated decaboranes. More particularly, it relates to a method for the preparation of alkylated decaboranes by the reaction of alkylated tetraboranes with diborane.

The preparation and manner of using liquid alkylated decaboranes, such as monoethyldecaborane, as a fuel when burned with air is described in Altwicker, Garrett, Weilmuenster and Harris application Serial No. 497,407, filed March 28, 1955, and issued as U.S. Patent No. 2,999,117 on September 5, 1961. The method for the preparation of the alkylated decaboranes described in application Serial No. 497,407, as well as those described in Neff and Wandel application Serial No. 519,308, filed July 1, 1955, and issued as U.S. Patent No. 3,113,153 on December 3, 1963, and Stange application Serial No. 544,068, filed October 31, 1955, and issued as U.S. Patent No. 3,158,653 on November 24, 1964, involve the use of decaborane as such as a starting material. The present invention provides a method whereby alkylated decaboranes can be produced using as starting materials substances other than decaborane.

This is accomplished in accordance with the present invention by reacting an alkyl tetraborane and diborane under suitable reaction conditions. The alkyl tetraborane utilized as a reactant is a monoalkyltetraborane conforming to the formula $RB_4H_9$, wherein R is an alkyl radical containing from 2 to 5 carbon atoms. Monoethyltetraborane can be prepared by reacting ethylene and tetraborane as described in Faust, De Lorenzo and Weilmuenster application Serial No. 505,706, and other monoalkyltetraboranes wherein the alkyl radical contains from 2 to 5 carbon atoms can be prepared in a similar manner by using other monoolefin hydrocarbons in place of ethylene, for example, propylene, 1-butene, or amylenes. In preparing the alkylated decaboranes in accordance with the present process, generally approximately 3 moles of diborane per mole of monoalkyltetraborane are introduced into the reaction zone. The relative amounts of diborane and monoalkyltetraborane introduced into the reaction zone is not critical, however, but instead can be varied considerably. Usually, however, from 1 to 10 moles of diborane per mole of monoalkyltetraborane is introduced into the reaction. The reaction temperature can also be varied widely, generally being within the range from 50° C. to 250° C. and preferably within the range from 140° C. to 160° C. The reaction pressure will generally be within the range from 50 p.s.i.g. to 500 p.s.i.g., and the reaction time will generally vary from ¼ hour to 7 hours or somewhat more.

The following examples illustrate various embodiments falling within the scope of the present invention and are to be considered not limitative. In the examples, the term "moles" signifies gram moles.

Example I 48.8 millimoles of diborane and 15.5 millimoles of monoethyltetraborane were condensed in a 110 ml. stainless steel autoclave bomb and sealed off. The bomb was first subjected to a temperature of 80° C. but no appreciable pressure increase occurred. The bomb was then slowly raised to a temperature of 140° C. over a period of three hours. It was observed that a discontinuity of the heating curve appeared at 105–110° C. but no sudden pressure change took place. The pressure slowly increased autogenously to 200 lb./sq. in. at 140° C. and over a period of ½ hour at 140° C. no further increase took place. The volatile bomb contents were pumped into a vacuum system and separated by conventional means. The non-volatile residues remaining in the bomb were admixed with 100 ml. of heptane and the mixture was filtered under a nitrogen flow. The filtrate, upon evaporation under vacuum, yielded monoethyldecaborane as determined by infrared analysis. The experimental conditions are given below:

Highest temperature reached
  by the bomb _____ 140° C.
Diborane recovered _____ 31.5 mmoles.
Volatile materials other than
  diborane recovered _____ 8.15 mmoles.
Monoethyldecaborane recovered __ 0.2 g. (1.34 mmoles).
Boron found in solids _____ 35.13 mg. atoms.
Percent conversion based upon
  monoethyldecaborane _____ 100.
Percent yield of monoethyldecaborane _____ 8.6.
Percent boron recovered _____ 98.8.

Example II 10.83 millimoles of monoethyltetraborane and 60.6 millimoles of diborane were condensed in an evacuated 110 ml. stainless steel autoclave bomb at −196° C. and then the bomb was sealed off. The bomb was then allowed to warm to room temperature and was subsequently heated. The temperature was raised slowly over a period of 5¾ hours with a seemingly autogenous rise in pressure. No sharp breaks in the pressure curve were observed. Monoethyldecaborane was isolated by leaching the non-volatile residue in the bomb with 100 ml. of petroleum ether. The clear, filtrated petroleum ether solution was evaporated in vacuo and the resulting drops of monoethyldecaborane produced were submitted for infrared analysis.

The amount of ethyldecaborane isolated indicated a relatively high yield but the semi-micro amounts of reactants and products alike made the absolute determination of the product mass impractical. The data for this example are summarized below:

Highest temperature reached by the bomb ___° C__ 158
Highest pressure reached by the bomb _____p.s.i.g__ 360
Percent conversion based upon
  monoethyltetraborane _____ 100
Diborane recovered _____percent__ 26.4
Hydrogen found _____mmoles__ 72.4

I claim:
1. A method for the production of an alkylated decaborane which comprises reacting one mole of monoalkyltetraborane of the formula $RB_4H_9$ wherein R is an alkyl radical containing from 2 to 5 carbon atoms with from 1 to 10 moles of diborane at a temperature within the range from 50° C. to 250° C.
2. The method of claim 1 wherein said monoalkyltetraborane is monoethyltetraborane.

No references cited.

TOBIAS E. LEVOW, *Primary Examiner.*
CARL D. QUARFORTH, *Examiner.*